US011603988B2

(12) United States Patent
Lear

(10) Patent No.: US 11,603,988 B2
(45) Date of Patent: Mar. 14, 2023

(54) HUMID AIR TURBINE POWER, WATER EXTRACTION, AND REFRIGERATION CYCLE

(71) Applicant: University of Florida Research Foundation, Inc., Gainesville, FL (US)

(72) Inventor: William E. Lear, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/386,483

(22) Filed: Jul. 27, 2021

(65) Prior Publication Data
US 2021/0356117 A1    Nov. 18, 2021

Related U.S. Application Data

(62) Division of application No. 16/284,152, filed on Feb. 25, 2019, now Pat. No. 11,105,498, which is a division of application No. 14/940,907, filed on Nov. 13, 2015, now Pat. No. 10,247,408.

(60) Provisional application No. 62/079,616, filed on Nov. 14, 2014.

(51) Int. Cl.
F02C 7/08    (2006.01)
F22B 1/18    (2006.01)

(52) U.S. Cl.
CPC .............. *F22B 1/1815* (2013.01); *F02C 7/08* (2013.01); *Y02E 20/14* (2013.01); *Y02P 80/15* (2015.11)

(58) Field of Classification Search
CPC .... F25B 27/02; F02C 7/08; F02C 3/34; F02C 1/08; F01K 23/10
See application file for complete search history.

(56) References Cited

U.S. PATENT DOCUMENTS

2003/0121268 A1* 7/2003 Erickson ................... F02C 7/08
60/775

* cited by examiner

*Primary Examiner* — Gerald L Sung
(74) *Attorney, Agent, or Firm* — Thomas | Horstemeyer, LLP

(57) ABSTRACT

Various embodiments relate to combined heat and power (CHP) systems. A CHP system can include a turbine system, a turbocharger system, and a refrigeration system. The refrigeration system can receive combustion products from the turbine system and compressed air from the turbocharger system. The refrigeration system can cool the combustion products and the compressed air to generate a cooled combustion product mixture that is provided to the turbine system.

15 Claims, 5 Drawing Sheets

HUMID AIR TURBINE POWER, WATER EXTRACTION, AND REFRIGERATION CYCLE

CROSS-REFERENCE TO RELATED APPLICATIONS

This application is a divisional of, and claims priority to, co-pending U.S. patent application entitled "HUMID AIR TURBINE POWER, WATER EXTRACTION, AND REFRIGERATION CYCLE," filed on Feb. 25, 2019 and assigned Ser. No. 16/284,152, which is a divisional of, and claims priority to U.S. patent application entitled "HUMID AIR TURBINE POWER, WATER EXTRACTION, AND REFRIGERATION CYCLE," filed on Nov. 13, 2015, and assigned application Ser. No. 14/940,907, which claims priority to U.S. Provisional Application No. 62/079,616, titled "HUMID AIR TURBINE POWER, WATER EXTRACTION, AND REFRIGERATION CYCLE" and filed on Nov. 14, 2014, which are incorporated by reference herein in their entireties.

BACKGROUND

Combustion turbines can be used to generate mechanical power and/or electricity. To this end, a combustion turbine can ignite a mixture of fuel and air in order to drive a turbine shaft. A byproduct of the combustion can be the production of heat and water.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed towards combined heat and power (CHP) systems. In some embodiments, such a CHP system can automatically capture much of the fresh water that is generated in the combustion process that drives the CHP system, as well as capturing water from the incoming humid air. In addition, the fresh water that is generated can be used by the CHP system to enhance system efficiency.

Figure 1:
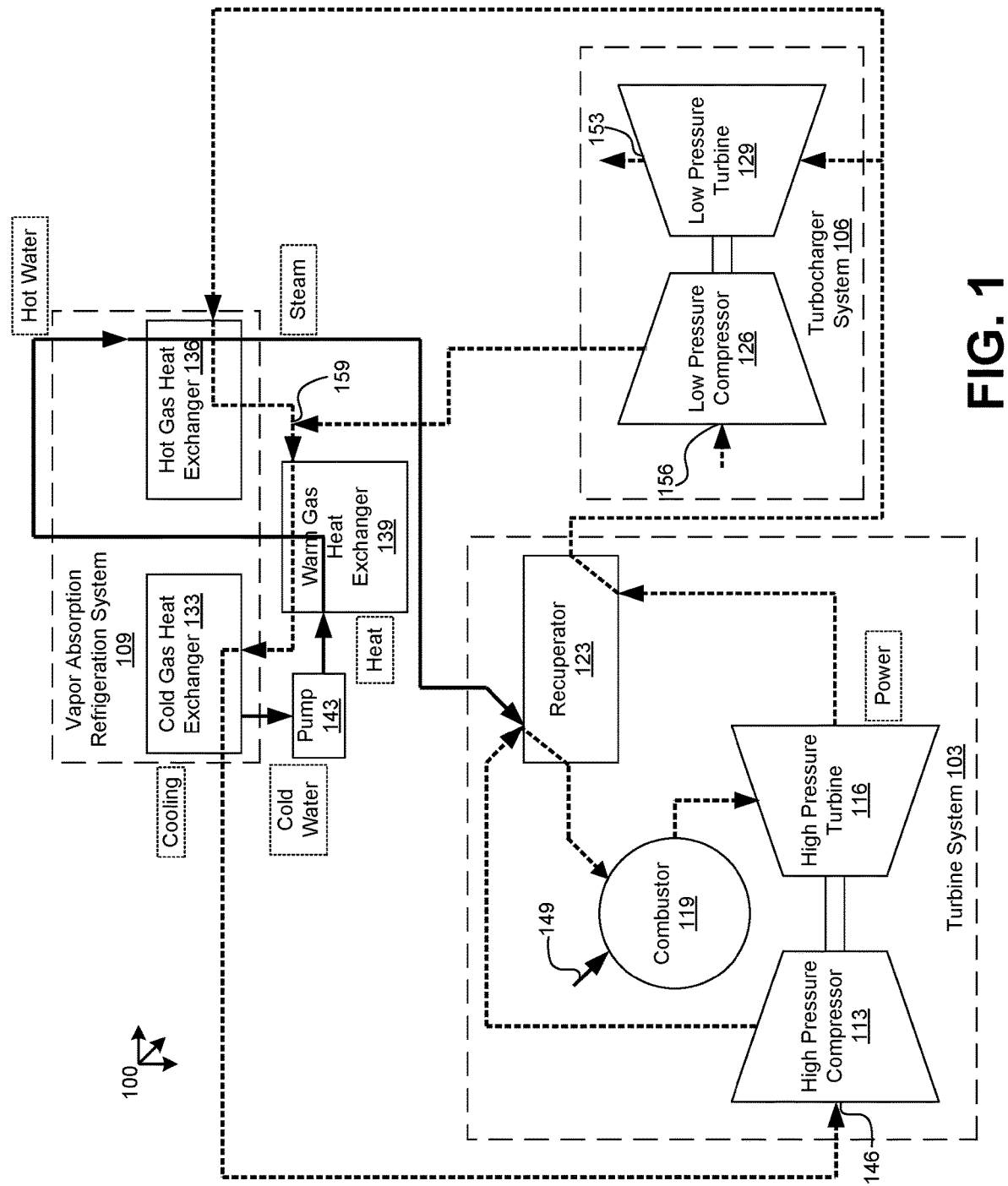
FIG. 1 is a drawing of a combined heat and power (CHP) system according to various embodiments of the present disclosure.

With reference to FIG. 1, shown is an example of a CHP system 100 in accordance with various embodiments of the present disclosure. The CHP system 100 can be used within in an electric grid network that comprises multiple systems that provide electricity for the electric grid. In alternative examples, the CHP system 100 can be a stand-alone system that, for example, provides electricity in emergency situations, for loads that do not have access to an electric grid, for military operations (e.g., forward operating bases), and/or other systems.

As shown, the CHP system 100 can include a turbine system 103, a turbocharger system 106, a vapor absorption refrigeration system 109, and/or other systems. The turbine system 103, the turbocharger system 106, and the vapor absorption refrigeration system 109 can be interconnected using piping, conduit, conductors for power and/or data signals, and/or other components.

The turbine system 103 shown in FIG. 1 can include a high pressure compressor 113, a high pressure turbine 116, a combustor 119, a recuperator 123, and/or other components. The high pressure compressor 113 can be a system configured to receive and compress a mixture of fresh air and recirculated combustion products, as will be described in further detail below. The combustor 119 can be a system that is configured to combust compressed gases to thereby generate a high-temperature flow of combustion gases. The high pressure turbine 116 of the turbine system 103 can be a system in which combustion gases expand and drive a load, such as a generator. As will be described in further detail below, the recuperator 123 can be an energy recovery system that absorbs heat from combustion products.

As shown in FIG. 1, the turbocharger system 106 can comprise a low pressure compressor 126, a low pressure turbine 129, and/or other components. The low pressure turbine 129 of the turbocharger system 106 can receive combustion products from turbine system 103. In addition, the low pressure turbine 129 can drive the low pressure compressor 126 of the turbocharger system 106.

As shown in FIG. 1, the vapor absorption refrigeration system 109 can comprise a cold gas heat exchanger 133, a hot gas heat exchanger 136, and/or other components. Additionally, a warm gas heat exchanger 139 and a pump 143 may be associated with the vapor absorption refrigeration system 109.

The hot gas heat exchanger 136 of the vapor absorption refrigeration system 109 can receive and absorb heat from combustion products provided by the turbine system 103. In some embodiments, the hot gas heat exchanger 136 can be used to generate steam and provide heat to the vapor absorption refrigeration system 109. The warm gas heat exchanger 139 associated with the vapor absorption refrigeration system 109 can receive and absorb heat from combustion gases provided by the turbocharger system 106 and the hot gas heat exchanger 136. The warm gas heat exchanger 139 can be an intercooler, meaning that it can extract heat from the combustion gases and transfer the heat to an ambient fluid, such as air. The extracted heat can be used to heat water. The cold gas heat exchanger 133 of the vapor absorption refrigeration system 109 can receive and absorb heat from a mixture of air and combustion products provided by the warm gas heat exchanger 139. In addition, the cold gas heat exchanger 133 can be used to generate cold water (e.g., condense water), which will be described in further detail below. The pump 143 can be used to pump the generated water to various destinations.

FIG. 1 also illustrates the pathways for fresh air, combustion products, and water for the CHP system 100. In particular, the pathways for fresh air and combustion products are shown using dashed lines, and the pathway for water (in liquid and/or gaseous form) is shown using solid lines.

Beginning with inlet 146, a mixture of fresh air and recirculated combustion products is provided to the high pressure compressor 113. Further description regarding this mixture of fresh air and recirculated combustion products is provided below. The high pressure compressor 113 compresses the mixture of fresh air, steam, and recirculated combustion products, and the compressed gases are provided to the cold side of the recuperator 123.

The recuperator 123 heats the compressed gases and provides the compressed gases, along with vapor, to the combustor 119. At the combustor 119, fuel 149 is combusted using the compressed gases to generate a high-temperature flow of combustion gases. These combustion gases are provided to the high pressure turbine 116, where the combustion gases expand and drive a generator and/or any other type of mechanical load. In this way, the turbine system 103 may produce mechanical power and/or electricity for one or more loads.

The combustion products from the high pressure turbine 116 are provided to the hot side of the recuperator 123, which absorbs heat from the combustion products. The combustion product flow is then divided to be provided to the turbocharger system 106 and the vapor absorption refrigeration system 109.

In particular, a portion of the combustion products from the turbine system 103 are provided to the low pressure turbine 129 of the turbocharger system 106. The combustion products provided to the low pressure turbine 129 drive the low pressure compressor 126. Additionally, exhaust is emitted from the low pressure turbine 129 at outlet 153.

At inlet 156, fresh air is provided to the low pressure compressor 126 of the turbocharger system 106. The fresh air may be filtered, and the inlet 156 may be sound damped. This fresh air is compressed by the low pressure compressor 126. In some embodiments, the fresh air is compressed by a factor of five. As a non-limiting example, if the atmospheric pressure is 1.0 atm, the low pressure compressor 126 compresses the fresh air to a pressure of 5.0 atm. The low pressure compressor 126 may compress the fresh air at other factors in other embodiments. The compressed fresh air is then mixed with combustion products at point 159. The compressed fresh air can also be mixed with the recirculator products between the warm gas heat exchanger 139 and the cold gas heat exchanger 133.

As mentioned above, a portion of the combustion products from the turbine system 103 is also provided to the vapor absorption refrigeration system 109. In particular, this portion of the combustion products is provided to the hot gas heat exchanger 136, which absorbs heat from the combustion products. The heat from combustion products provided to the hot gas cooler also drives the vapor absorption refrigeration system 109.

The combustion products may then be provided from the hot gas heat exchanger 136 to point 159 where the combustion products are mixed with fresh air provided by the low pressure compressor 126 of the turbocharger system 106. In some embodiments the combustion products and fresh air are mixed at a 3-to-1 ratio of combustion products to fresh air. The combustion products and fresh air may be mixed at other ratios and/or at other points in the flow path in other embodiments.

The mixture of combustion products and fresh air is then provided to the warm gas heat exchanger 139. The warm gas heat exchanger 139 absorbs heat from the mixture of combustion products and fresh air. This absorbed heat may be provided to external systems. Additionally, this heat is used to heat water within the CHP system 100, as will be described in further detail below. Additionally, heat absorbed by the vapor absorption refrigeration system 109 can also be used to heat water.

The mixture of combustion products and fresh air is then provided from the warm gas heat exchanger 139 to the cold gas heat exchanger 133. The cold gas heat exchanger 133 absorbs heat from the mixture of combustion products and fresh air. In some embodiments, the vapor absorption refrigeration system 109 may comprise an additional heat exchanger (not shown) for which refrigerant associated with the cold gas heat exchanger may be used to cool an external load.

The chilled mixture of combustion products and fresh air is then provided from the cold gas heat exchanger 133 of the vapor absorption refrigeration system 109 to the inlet 146 of the high pressure compressor 113. The chilled mixture of combustion products and fresh air may result in an improved cycle thermodynamic efficiency relative to other systems that do not provide a chilled mixture of combustion products and fresh air. As a non-limiting example, the chilled mixture may comprise a 3-to-1 ratio of combustion products to fresh air, the temperature of the chilled mixture may be approximately 3° C., and the pressure of the chilled mixture may be approximately 3 atm. The chilled mixture of combustion products and fresh air may have other characteristics in other embodiments.

When the cold gas heat exchanger 133 operates to, for example, chill the mixture of combustion products and fresh air, fresh water may condense on or near the cold gas heat exchanger 133. This fresh water may be provided to external systems. In addition, the fresh water may be provided to the pump 143, which may increase the water pressure.

The water may then be provided to the warm gas heat exchanger 139 and/or the vapor absorption refrigeration system 109. Heat from the warm gas heat exchanger 139 increases the temperature of the water. This hot water may be provided to external systems. Additionally, the hot water is provided from the warm gas heat exchanger 139 to the hot gas heat exchanger 136, which increases the temperature of the hot water to generate steam. The steam may be provided to external systems. Additionally the steam is provided from the hot gas heat exchanger 136 of the vapor absorption refrigeration system 109 to the recuperator 123 of the turbine system 103.

In alternative examples, instead of the vapor absorption refrigeration system 109 providing steam to the recuperator 123, the vapor absorption refrigeration system 109 can provide water in liquid form to the recuperator 123. In these alternative examples, the liquid water can be provided to a saturator that causes the liquid water to evaporate and mix with the compressed gases from the high pressure compressor 113.

At the recuperator 123, the steam is combined with the mixture of combustion products and fresh air from the high pressure compressor 113 of the turbine system 103. This humid mixture of combustion products and fresh air is then provided to the combustor 119, where the fuel 149 is combusted. The humid mixture of combustion products may result in combustion that is more efficient relative to systems that do not provide a humid mixture of combustion products for combustion.

The CHP system 100 may provide several benefits relative to conventional systems. For example, the CHP system 100 described herein may have a higher "on" design efficiency as compared to conventional turbine systems due to the relatively low temperature entering the turbine system 103. In addition, the CHP system 100 may have a higher "off" design efficiency relative to conventional turbine systems due to holding the turbine system 103 at a relatively fixed set of temperature states. Additionally, the CHP system 100 may be more reliable, quieter, have a lower cost of materials, have a faster time response, and have lower emissions levels relative to conventional systems.

Figure 2A:
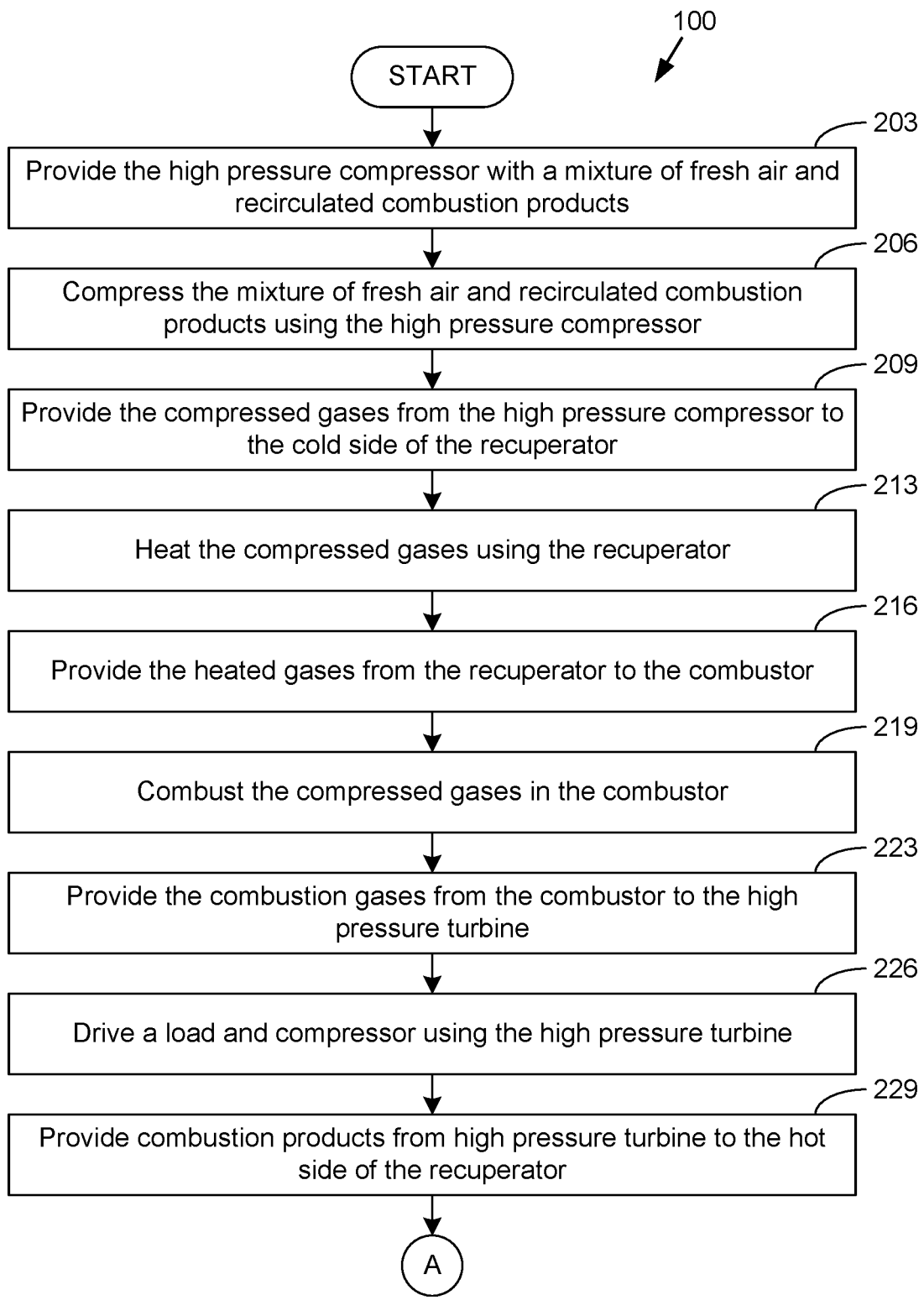
FIGS. 2A-2C are a flowchart illustrating an example of the operation of the CHP system of FIG. 1 according to various embodiments of the present disclosure.
Figure 2B:
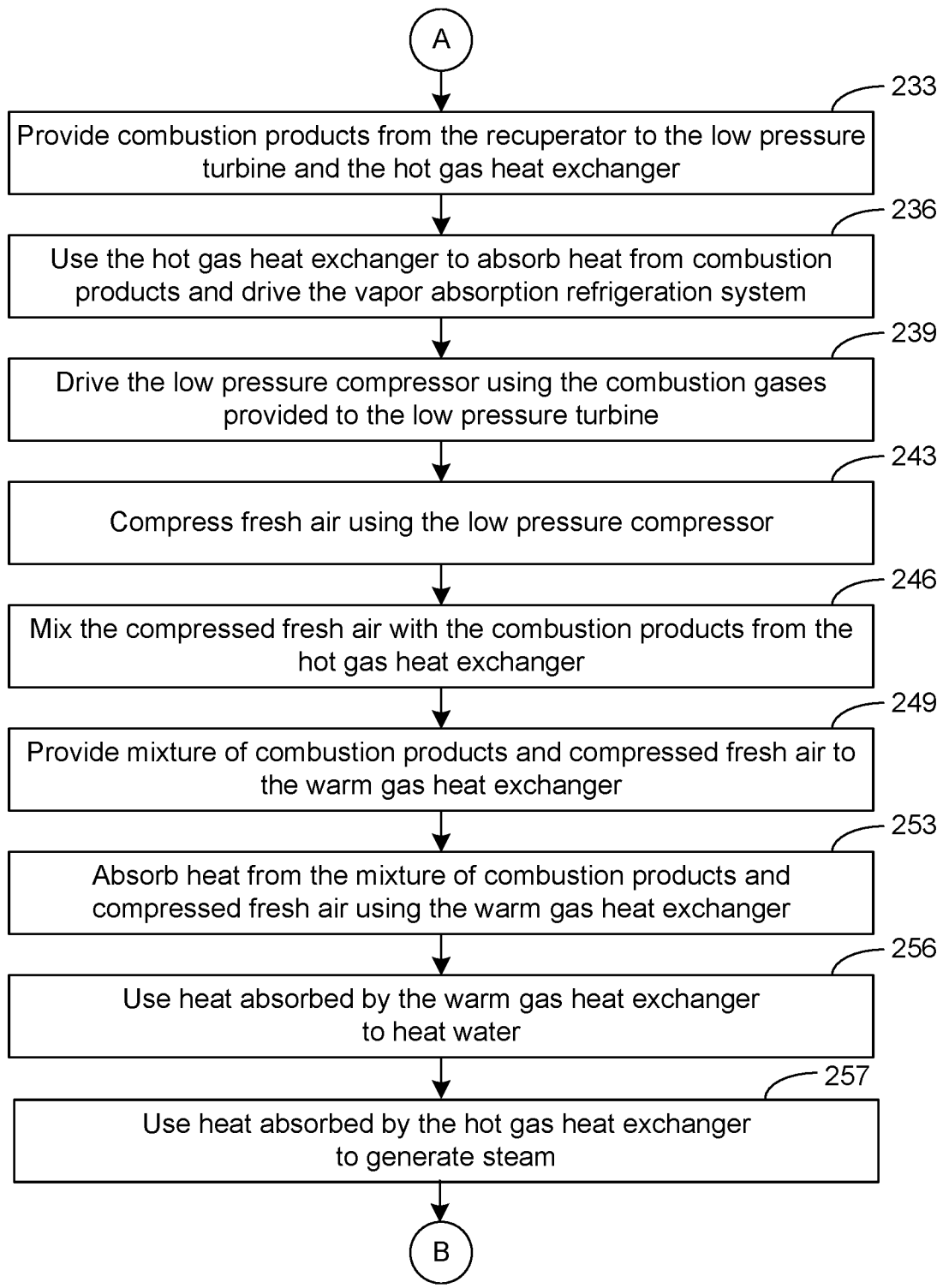
Figure 2C:
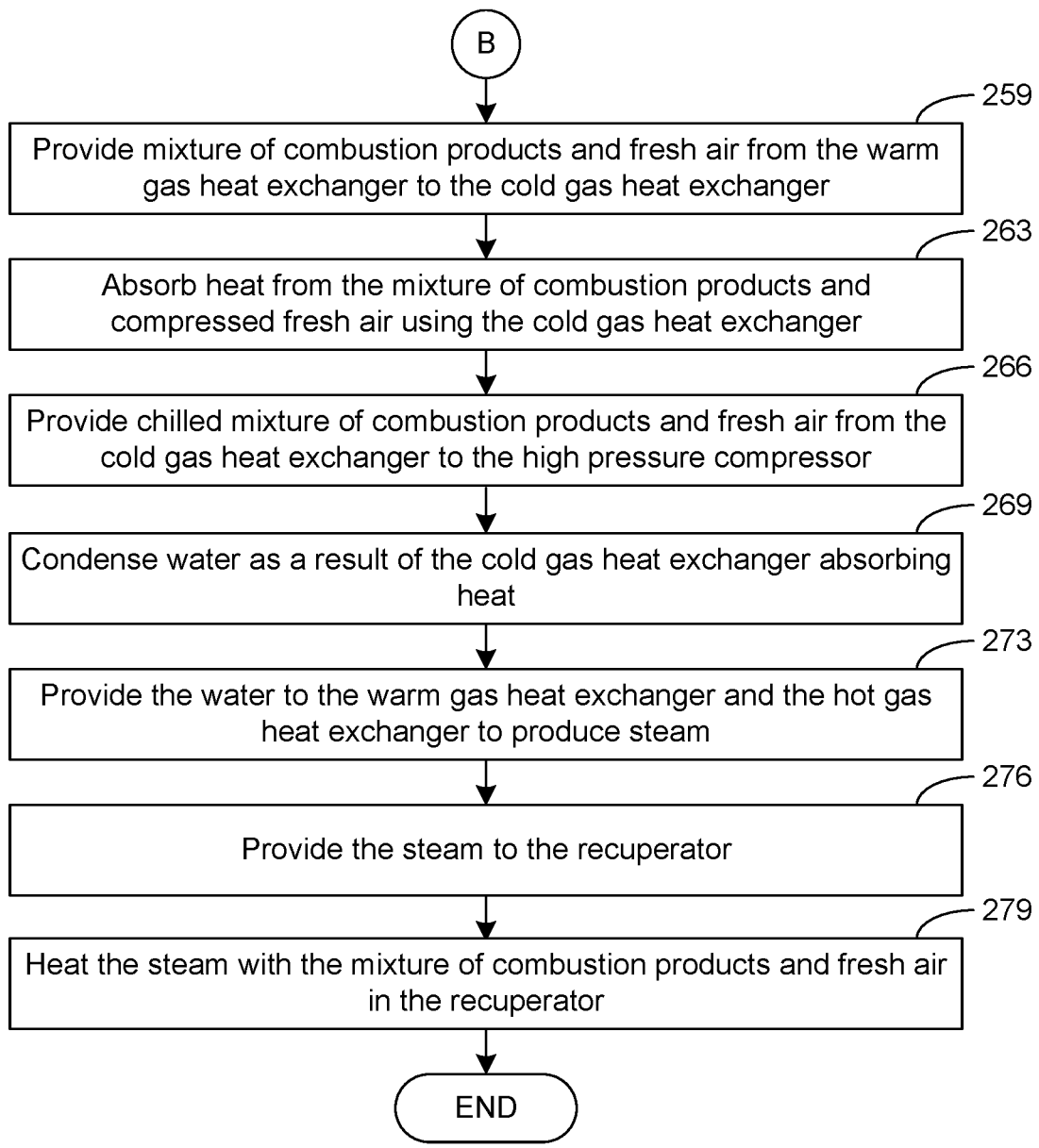

With reference to FIGS. 2A-2C, shown is a flowchart that illustrates an example of the operation of the CHP system 100 according to various embodiments. It is understood that the flowchart of FIG. 2 provides merely one example, among others, of the operation go the CHP system 100. Although the flowchart of FIG. 2 shows a specific order of operation, the order of execution may differ from that which is depicted. For example, the order of performance of two or more boxes may be switched relative to the order shown. Also, two or more boxes shown in succession in FIG. 2 can be performed concurrently or with at least partial concurrence. Further, in some embodiments, one or more of the boxes shown in FIG. 2 can be skipped or omitted.

Beginning with box 203, the high pressure compressor 113 is provided with a mixture of fresh air and recirculated combustion products. At box 206, the mixture of fresh air and recirculated combustion products is compressed using the high pressure compressor 113. The compressed gases are then provided from the high pressure compressor 113 to the cold side of the recuperator 123, as shown at box 209.

At box 213 the recuperator 123 heats the received compressed gases. The heated gases are then provided from the recuperator 123 to the combustor 119, as shown at box 213. As indicated at box 216, the heated gases are then provided from the recuperator 123 to the combustor 119, and the combustor 119 then combusts the compressed gases, as shown at box 219. At box 223, the combustion gases from the combustor 119 are then provided to the high pressure turbine 116.

At box 226, the high pressure turbine 116 drives a load, such as a generator, as a result of the combustion gases expanding in the high pressure turbine 116. The combustion products are also provided from the high pressure turbine 116 to the hot side of the recuperator 123, as indicated at box 229.

At box 233, which is shown in FIG. 2B, combustion products are provided from the hot side of the recuperator 123 to the low pressure turbine 129 of the turbocharger system 106 and also to the hot gas heat exchanger 136 of the vapor absorption refrigeration system 109. As indicated at box 236, the hot gas heat exchanger 136 absorbs heat from the provided combustion products and drives the vapor absorption refrigeration system 109. At box 239, the low pressure turbine 129 uses the provided combustion gases to drive the low pressure compressor 126, and the low pressure compressor 126 compresses fresh air, as shown at box 243. The compressed fresh air is then mixed with the combustion products from the hot gas heat exchanger 136, as indicated at box 246.

As shown at box 249, the mixture of the combustion products and compressed fresh air is provided to the warm gas heat exchanger 139. The warm gas heat exchanger 139 then absorbs heat from the received mixture of combustion products and compressed air, as shown at box 253, and the absorbed heat is used by the warm gas heat exchanger 139 to heat water, as shown at box 256. The absorbed heat is used by the hot gas heat exchanger 136 to generate steam, as shown at box 257.

At box 259, which is shown on FIG. 2C, the mixture of combustion products and fresh air are provided from the warm gas heat exchanger 139 to the cold gas heat exchanger 133, where the cold gas heat exchanger 133 absorbs heat from the received mixture, as indicated at box 263. Then, as shown at box 266, the chilled mixture of combustion products and fresh are is provided from the cold gas heat exchanger 133 to the high pressure compressor 113. As a result of the cold gas heat exchanger 133 absorbing heat, water condenses on or near the cold gas heat exchanger 133, as shown at box 269.

As indicated at box 273, the condensed water is provided to the warm gas heat exchanger 139 and the hot gas heat exchanger 136 to produce steam. At box 276, the steam is provided to the recuperator 123. The steam is then combined and heated with the mixture of combustion products and fresh air in the combustor 119, as shown at box 279. Thereafter, the process ends.

Figure 3:
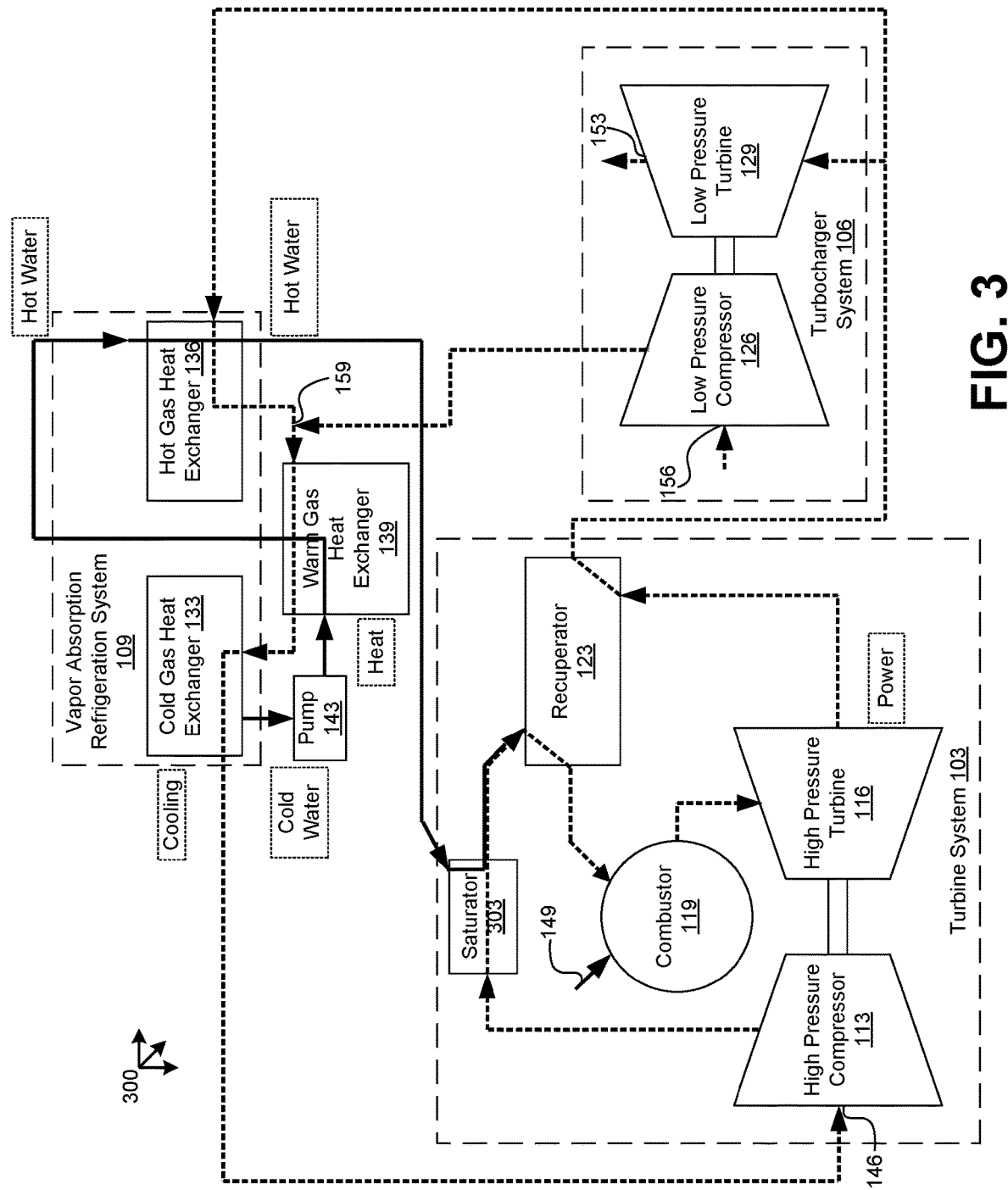
FIG. 3 is a drawing of another CHP system according to various embodiments of the present disclosure.

With reference to FIG. 3, shown is another example of a CHP system 100, referred to herein as the CHP system 300. The CHP system 300 shown in FIG. 3 is similar to the CHP system 100 shown in FIG. 1.

However, for the CHP system 300 illustrated in FIG. 3, the turbine system 103 also includes a saturator 303. In addition, instead of providing steam from the hot gas heat exchanger 136, the CHP system 300 provides hot water from the hot gas heat exchanger 136. As shown in FIG. 3, the hot water is provided to a saturator 303. The saturator 303 can cause the received how water to evaporate and mix with the compressed gases from the high pressure compressor 113. The mixture of evaporated water and compressed gases is then provided to the recuperator 123, as shown in FIG. 3.

The above-described embodiments are merely examples of implementations to set forth a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, the following is claimed:

1. An apparatus, comprising:
a turbine system that comprises a combustor, the combustor being configured to generate combustion products;
a refrigeration system that comprises a cold gas heat exchanger, the refrigeration system receiving the combustion products from the turbine system;
a warm gas heat exchanger that receives a mixture of the combustion products and air, the warm gas heat exchanger being configured to absorb heat from the mixture of the combustion products and air; and
the cold gas heat exchanger generates water from the mixture of the combustion products and air provided by the warm gas heat exchanger.

2. The apparatus of claim 1, wherein the refrigeration system comprises a hot gas heat exchanger that generates cooled combustion products by cooling the combustion products provided by the turbine system.

3. The apparatus of claim 2, wherein the warm gas heat exchanger receives the mixture of the combustion products and air, wherein the mixture of the combustion products and air comprises a mixture of the cooled combustion products from the hot gas heat exchanger and compressed air from a low pressure compressor of a turbocharger system.

4. The apparatus of claim 1, further comprises:
a pump of the refrigeration system that provides the water from the cold gas heat exchanger to the warm gas heat exchanger.

5. The apparatus of claim 1, wherein the refrigeration system comprises a vapor absorption system.

6. The apparatus of claim 1, further comprising:
a hot gas heat exchanger that generates steam from the water; and
wherein the combustor combusts a combination of the steam and the mixture of the combustion products and air to generate the combustion products, and the combustor provides the combustion products to a high pressure turbine.

7. The apparatus of claim 6, wherein the high pressure turbine is configured to drive a load and a high pressure compressor from the combustion products.

8. The apparatus of claim 1, further comprising:
a turbocharger system that comprises a low pressure compressor; and
the low pressure compressor is driven by the combustion products provided to a low pressure turbine.

9. The apparatus of claim 8, wherein the low pressure compressor is configured to generate compressed air and mix the compressed air with the combustion products to create the mixture of the combustion products and air.

10. The apparatus of claim 9, wherein the compressed air is compressed by a factor of five.

11. The apparatus of claim 9, wherein the warm gas heat exchanger is configured to absorb heat from the mixture of the combustion products and air, and the warm gas heat exchanger applies the heat to the water.

12. The apparatus of claim 11, wherein the warm gas heat exchanger is configured to provide the mixture of the combustion products and air to the cold gas heat exchanger.

13. The apparatus of claim 12, wherein the cold gas heat exchanger is configured to generate a chilled mixture of the combustion products and air by absorbing heat from the mixture of the combustion products and air provided by the warm gas heat exchanger.

14. The apparatus of claim 13, wherein the chilled mixture of the combustion products and air is provided from the cold gas heat exchanger to a high pressure compressor.

15. The apparatus of claim 11, further comprises:
a hot gas heat exchanger that generates steam from the water; and
a recuperator that receives the steam from the hot gas heat exchanger, wherein the mixture of the combustion products and air are provided from the recuperator to the low pressure turbine associated with the turbine system and to the hot gas heat exchanger.

* * * * *